(12) United States Patent
Goodwin

(10) Patent No.: US 7,170,031 B2
(45) Date of Patent: Jan. 30, 2007

(54) EARTH CONNECTIONS FOR WORKPIECES

(75) Inventor: David Edward Goodwin, Nottingham (GB)

(73) Assignee: Goodwin Air Plasma Ltd. (GB)

( * ) Notice: Subject to any disclaimer, the term of this patent is extended or adjusted under 35 U.S.C. 154(b) by 37 days.

(21) Appl. No.: 11/058,379

(22) Filed: Feb. 15, 2005

(65) Prior Publication Data

US 2005/0178754 A1   Aug. 18, 2005

(30) Foreign Application Priority Data

Feb. 17, 2004   (GB) .................... 0403444.3

(51) Int. Cl.
*B23K 9/10* (2006.01)
(52) U.S. Cl. .................... 219/130.21; 361/42
(58) Field of Classification Search ........... 219/130.21, 219/130.1; 361/42, 45, 46, 49, 50
See application file for complete search history.

(56) References Cited

U.S. PATENT DOCUMENTS 4,507,699 A   3/1985   Rohm 6,437,951 B1 *   8/2002   Ahlstrom et al. ............. 361/42

FOREIGN PATENT DOCUMENTS

| CH | 609897 A * | 3/1979 |
| DE | 19921295 A1 * | 11/2000 |
| EP | 0344850 A2 | 12/1989 |
| WO | WO 95/31028 A1 | 11/1995 |

\* cited by examiner

*Primary Examiner*—Clifford C. Shaw
(74) *Attorney, Agent, or Firm*—Trexler, Bushnell, Giangiorgi, Blackstone & Marr, Ltd.

(57) ABSTRACT

The invention relates to earth connections to workpieces particularly a workpiece to which an arc is to be struck, and more particularly to a workpiece that is underwater. It is of considerable importance that a workpiece is properly connected to earth, and that the impedance of the connection is not such as will elevate dangerously the voltage on the workpiece. The objective of the invention is to solve this problem, an objective met by an earth connection for workplaces that comprises a loop in the connection of the workpiece to earth, the loop being connected at each end to and being completed by the workpiece, and there being a sensor means to sense current flowing in the loop above a predetermined level.

10 Claims, 3 Drawing Sheets

EARTH CONNECTIONS FOR WORKPIECES

PRIORITY APPLICATION

Figure 1:
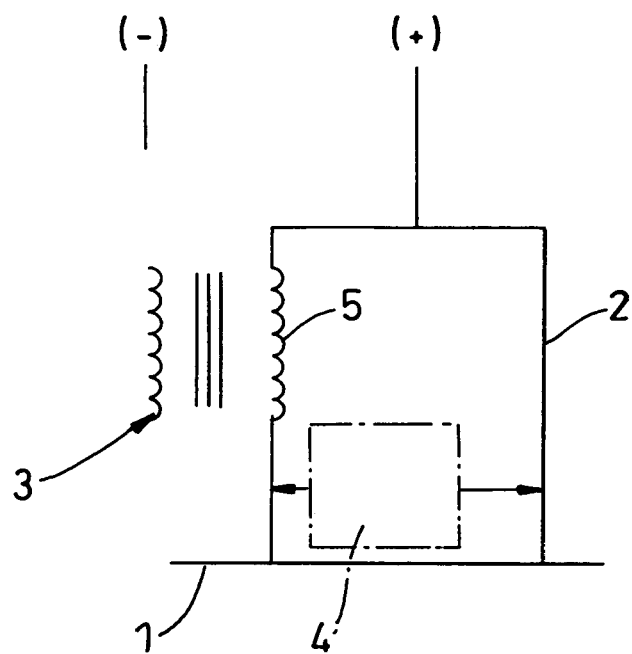

This application claims the benefit of British Application No. 0403444.3, filed Feb. 17, 2004.

BACKGROUND

This invention relates to earth connections to workpieces and is particularly but not necessarily exclusively concerned with a workpiece to which an arc is to be struck during arc processes suth as cutting or welding.

In open air and relatively dry conditions and with an arc process effected on a workpiece the voltage at the workplace can be raised, and if a circumstance arose where the workpiece was not effectively earthed and the operative does connect to earth, then an electric shock can be caused to the operative at a level that is uncomfortable. This problem is exacerbated when using arc processes underwater, where it is necessary to use voltages at a level that could be hazardous to divers, and hence even more desirable to ensure that electrical connections are properly made.

This is particularly the case for connections to a workpiece which may be considered as one electrode of an arc process, which, being relatively large, may influence the potential to which the diver is exposed. It will often tend to be considered as an earth or ground and at the same potential as the diver. If this is not fully connected to the same "earth" as the diver, it could give rise to exposure of the diver to voltage when applying the arc process via the electrode of the supply. Even when the workpiece is properly connected to earth, it is necessary to ensure, when using higher current in the arc process, that the impedance of the connection is not so high as to cause the voltage on the workpiece relative to the diver to become elevated to hazardous levels. It might be noted that this hazard potential is not limited to processes used underwater.

An essential difficulty with all electrical connections, and particularly underwater, is that it is frequently impossible to be sure that the integrity of the connection is such that a workpiece is properly connected to earth and that the impedance of the connection is not such as will elevate voltage on the workpiece to hazardous levels.

OBJECTS AND SUMMARY

The object of the present invention is to provide a connection of a workpiece to earth the integrity of which can be constantly monitored.

According to the present invention, an earth connection for workpieces comprises a loop in the connection of the workpiece to earth, the loop being connected at each end to and being completed by the workpiece, and there being a sensor means to sense current flowing in the loop above a predetermined level. When the connections of the loop to the workpiece are effective, and hence the workpiece correctly earthed, a current flowing through the loop is sensed to confirm the integrity of the connections. The means to sense the presence of current in the loop may be such as to generate a signal to advise the operative, or may be such as to serve as a fail safe, only permitting an arc to be struck when current is sensed in the loop.

DESCRIPTION

Five embodiments of the invention are illustrated in the accompanying schematic circuit diagrams comprising FIGS. 1 to 5.

In a basic form of construction as is illustrated in FIG. 1, and in a direct arc process, direct current passes from a workpiece 1 through the loop 2 to earth, and an alternating current is caused to pass round the loop by a drive transformer 3, there being sensing means 4 associated with one leg at least of the loop to sense the presence of alternating current, thereby to confirm that the two connections of the workpiece to earth via the loop are effective, and additionally to confirm that the connections have low impedance to current. The alternating current is induced in the loop by the transformer 3, the secondary 5 of which passes direct current in one leg of the loop.

Figure 2:
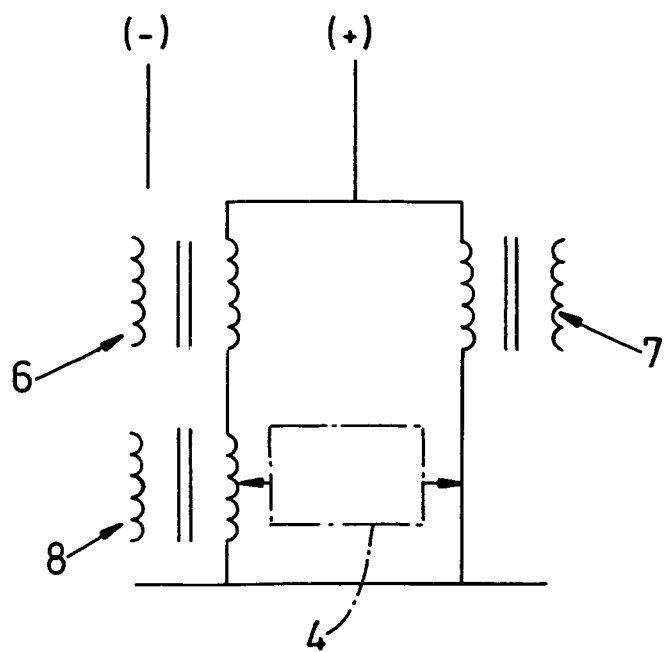

Equally possible, and as is illustrated in FIG. 2, is to have an alternating current drive 6,7 in each leg of the loop, and additionally to have a further transformer 8 to sense that current is flowing round the loop.

Figure 3:
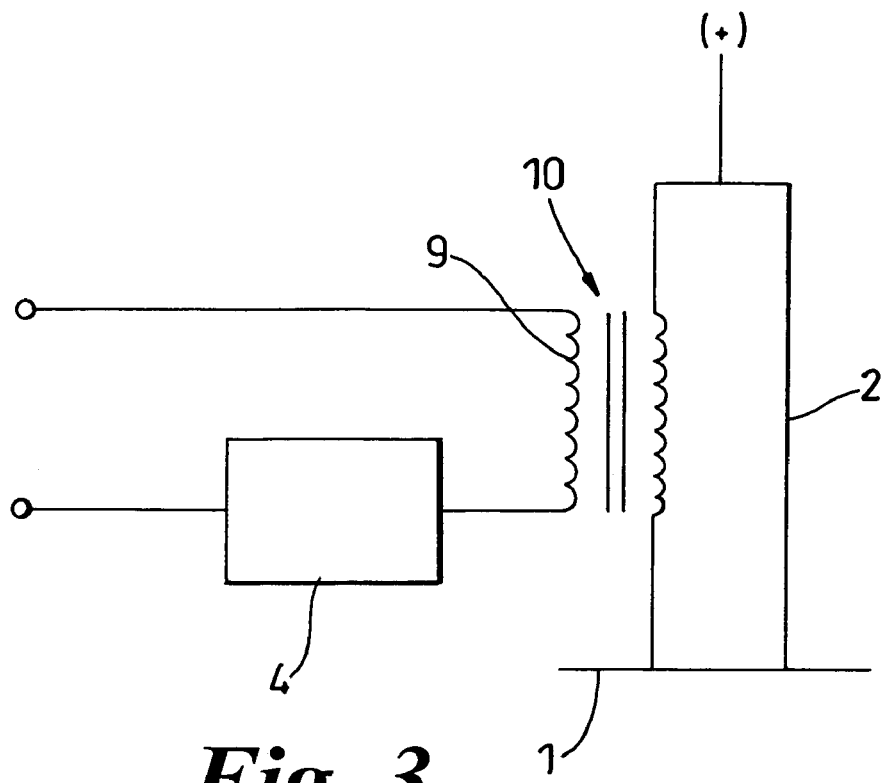
Figure 4:
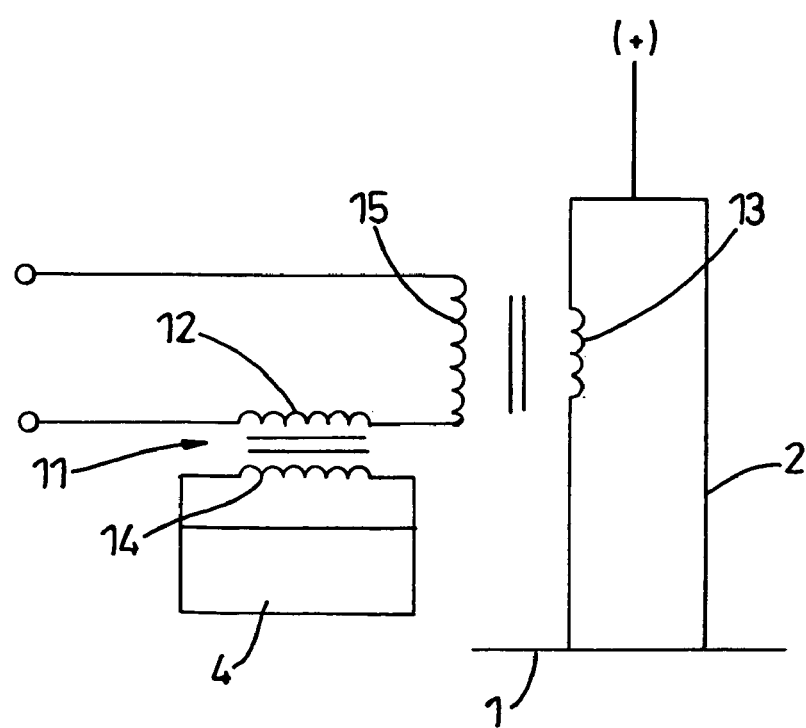

In an alternative arrangement as is illustrated in FIG. 3 and consequent on the nature of transformers, sensing means 4 sensing the current in the primary 9 of the drive transformer 10 would be indicative of current in the loop 2. Again, and as is illustrated in FIG. 4, a transformer can be used to sense current in the loop 2. Here, if the primary 12 of a second transformer 11, instead of only being a current sensing winding (low impedance) is a primary winding capable of supporting the full AC supply, it provides a method of sensing which depends on the relative current in the secondary windings 13 and 14, and hence the voltages across each of the two primaries 12 and 15 in series. Thus, if secondary 13 is open circuit and secondary 14 is driving the sense load, the majority of the AC supply voltage will be across primary 15 and the voltage across primary 12 and hence secondary 14 will be low. When the loop is made and secondary 13 approaches short circuit, the majority of the AC supply voltage will be across primary 12 and hence the sense load. The effect is to give amplification to the sensing circuit 4, and a sensitivity dependant on the relative values of the loop impedance and the sense load.

Figure 5:
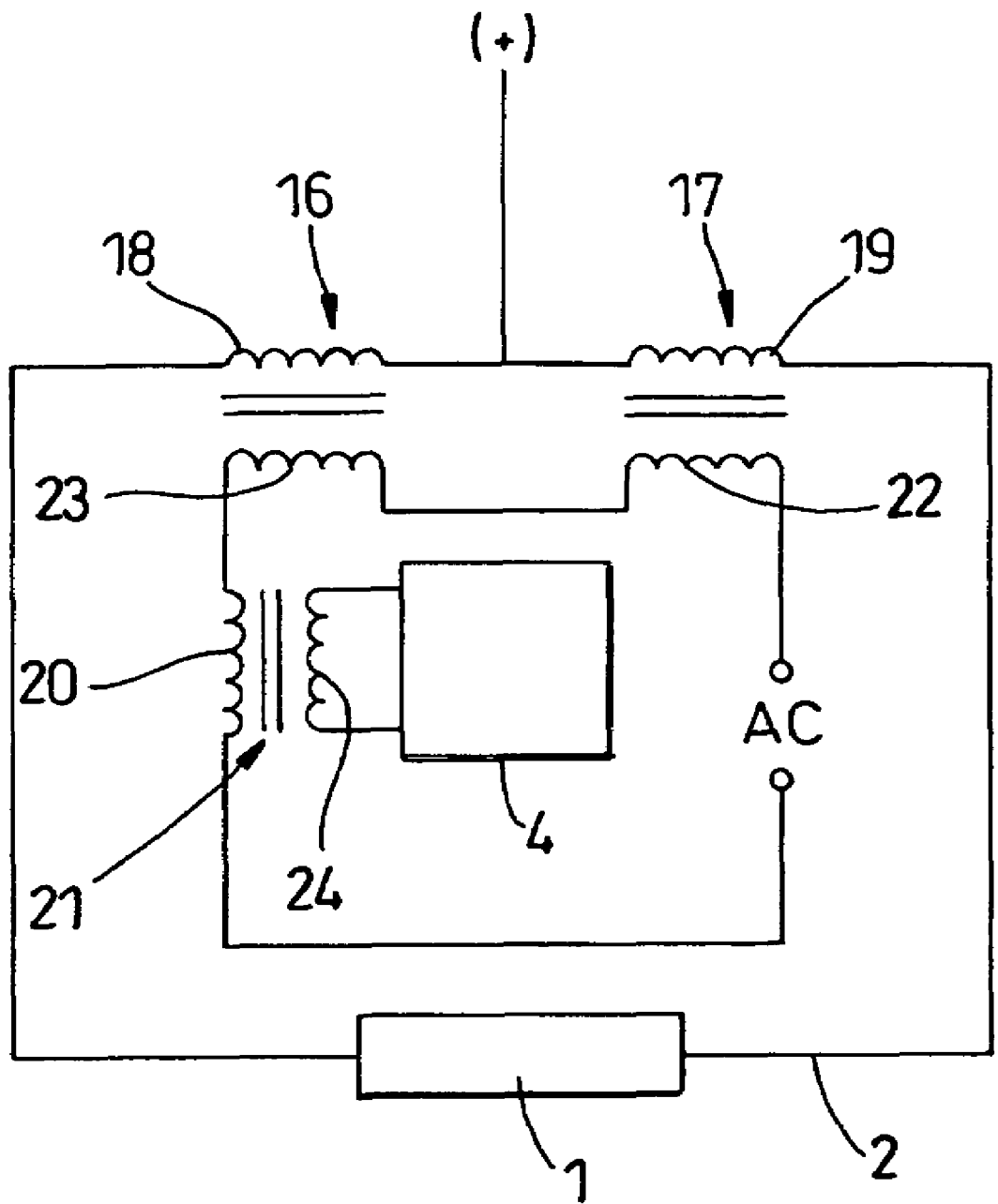

There may be a desirability of amplifying the sensitivity of the circuit to ensure that the loop 1 is completed by its connection to the workpiece 2 and not by other means. Thus, and as is illustrated in FIG. 5, a drive transformer 16,17 is placed in each connecting arm, and the two primaries 22, 23 placed in series with the primary 20 of a third transformer 21 which is connected to the sensing load. This ensures that the loop 2 is made through the intended connections (and not through some other "ground") since both secondary 19 and secondary 18 of the transformer 17, 16 must be passing a high monitoring current for secondary 24 of the transformer 21 to operate the sensing circuit.

The invention claimed is:

1. An earth connection for workpieces comprising a loop in the connection of the workpiece to earth, the loop being connected at each end to and being completed by the workpiece, and there being a means to cause a secondary or sensing current to flow in the loop and a sensor means to sense this current flowing in the loop above a predetermined level.

2. An earth connection for workpieces as in claim 1, wherein the means to sense the presence of the secondary or sensing current in the loop is such as to generate a signal to advise the operative.

3. An earth connection for workpieces as in claim 1, wherein the means to sense the presence of current in the loop is such as to serve as a fail safe, only permitting an arc to be struck when the secondary or sensing current is sensed in the loop.

4. An earth connection for workpieces as in claim 1 wherein, and in a direct arc process, direct current passes from a workpiece through the loop to earth, and an alternating current is caused to pass round the loop by a drive transformer, there being sensing means associated with one leg at least of the loop to sense the presence of alternating current, thereby to confirm that the two connections of the workpiece to earth via the loop are effective, and additionally to confirm that the connections have low impedance to current.

5. An earth connection for workpieces as in claim 4, wherein the alternating current is induced in the loop by a transformer, the secondary of which also passes direct current in one leg of the loop.

6. An earth connection for workpieces as in claim 4, wherein an alternating current drive is provided in each leg of the loop and a further sensing means provided to sense that current is flowing round the loop.

7. An earth connection for workpieces as in claim 1, wherein the sensing means for sensing current flowing in the loop is a sensing means associated with the primary of a drive transformer itself associated with one leg of the loop.

8. An earth connection for workpieces as in claim 7, wherein the means to sense current in the primary winding of the drive transformer, is a second transformer.

9. An earth connection for workpieces as in claim 8, wherein the primary winding of the second transformer supports a full AC supply to provide a method of sensing that depends on the relevant currents in the winding of a transformer in the loop and the secondary winding of the drive transformer, allowing the sensing of voltages across each of the two primaries of the driver and sensing transformers in series.

10. An earth connection for workpieces comprising a loop in the connection of the workpiece to earth, the loop being connected at each end to and being completed by the workpiece, and there being a sensor means to sense current flowing in the loop above a predetermined level, there being a driver transformer in each leg of the loop, the primary windings of said two drive transformers being connected in series with the primary winding of a third transformer, the secondary winding of which is connected to a sensing circuit.

* * * * *